(12) United States Patent
Kama

(10) Patent No.: US 11,141,653 B2
(45) Date of Patent: Oct. 12, 2021

(54) OPERATION ASSISTANCE APPARATUS FOR GAME CONTROLLER, AND OPERATION ASSISTANCE METHOD

(71) Applicant: Koji Kama, Yokohama (JP)

(72) Inventor: Koji Kama, Yokohama (JP)

( * ) Notice: Subject to any disclaimer, the term of this patent is extended or adjusted under 35 U.S.C. 154(b) by 0 days.

(21) Appl. No.: 16/744,178

(22) Filed: Jan. 16, 2020

(65) Prior Publication Data

US 2021/0023441 A1 Jan. 28, 2021

Related U.S. Application Data

(63) Continuation of application No. PCT/JP2017/026046, filed on Jul. 19, 2017.

(51) Int. Cl.
*A63F 13/24* (2014.01)

(52) U.S. Cl.
CPC .................. *A63F 13/24* (2014.09)

(58) Field of Classification Search
CPC ....................................... A63F 13/24
See application file for complete search history.

(56) References Cited

U.S. PATENT DOCUMENTS

| | | | | |
|---|---|---|---|---|
| 4,909,514 A | * | 3/1990 | Tano | A63F 13/02 273/148 B |
| 5,419,613 A | * | 5/1995 | Wedeking | A63F 13/98 297/217.1 |
| 5,820,462 A | | 10/1998 | Yokoi et al. | |

(Continued)

FOREIGN PATENT DOCUMENTS

| | | |
|---|---|---|
| JP | H08-45392 A | 2/1996 |
| JP | H11-151383 A | 6/1999 |

(Continued)

OTHER PUBLICATIONS

International Search Report for PCT/JP2017/026046 dated Oct. 24, 2017.

(Continued)

*Primary Examiner* — James S. McClellan
*Assistant Examiner* — Peter J Iannuzzi
(74) *Attorney, Agent, or Firm* — Yokoi & Co., U.S.A.; Toshiyuki Yokoi

(57) ABSTRACT

To reduce physical burden on a person playing a game by reducing the load exerted on the fingers pressing down on a cross key or on push buttons of a game controller.
[Solution] Provided is an operation assistance apparatus for assisting an operation carried out on a game controller that is disposed away from a game machine executing a game program and that inputs an operation signal for the game machine. The operation assistance apparatus is provided with grip cushions 3a, 3b that are disposed so as to face a cross key 22, etc. of the game controller 2 and that are mounted to grips 2a, 2b holding the game controller 2, wherein the grip cushions 3a, 3b have projections 30a, 30b that project toward the upper surface side of a grip portion where the cross key 22, etc. are disposed. The operation assistance apparatus is also provided with: a holder means 4 that holds and fixes the game controller 2 and that is capable of adjusting the inclination angle of the fixed game controller 2; and a pad 5 that fixes the holder means 4 while the holder means 4 is projected upward.

13 Claims, 10 Drawing Sheets

(56) References Cited

U.S. PATENT DOCUMENTS

| | | | | |
|---|---|---|---|---|
| 6,092,867 | A | * | 7/2000 | Miller ............... A63F 13/98 297/188.14 |
| 6,120,025 | A | * | 9/2000 | Hughes, IV ............ A63F 13/02 273/148 B |
| 2002/0132668 | A1 | * | 9/2002 | Soga ................. A63F 13/98 463/47 |
| 2005/0075172 | A1 | | 4/2005 | Coleman |
| 2006/0256090 | A1 | * | 11/2006 | Huppi ................ A63F 13/2145 345/173 |
| 2008/0064500 | A1 | | 3/2008 | Satsukawa et al. |
| 2008/0122173 | A1 | * | 5/2008 | Harris ............... A63F 13/02 273/148 B |
| 2017/0189800 | A1 | | 7/2017 | Crain |

FOREIGN PATENT DOCUMENTS

| | | |
|---|---|---|
| JP | 2004-129704 A | 4/2004 |
| JP | 3102907 U | 4/2004 |
| JP | 2007-159716 A | 6/2007 |
| JP | 2007-307284 A | 11/2007 |
| JP | 2008-67844 A | 3/2008 |
| JP | 2014-18534 A | 2/2014 |

OTHER PUBLICATIONS

PCT written opinion dated Oct. 24, 2017.
Japanese notice of the reason for refusal dated Aug. 21, 2018.
Japanese decision to grant a patent dated Feb. 26, 2019.
IOS7 Taio no Bluetooth Setsuzokugata Game Pad 'Stratus' ga Kokunai Hanbai Kaishi iPad demo Game Pad deno Play ga Kano ni, [online], Mar. 26, 2014, 4Gamer.net, [retrieval date Oct. 6, 2017], Internet <URL: http://www.4gamer.net/games/037/G003732/20140326013/>.
Sumaho no Gamen ga Okiku Mieru, Mobile Jushi no Stand-shiki Kakudaikyo o Tsukattemita, [online], Feb. 25, 2016, Shanghai Don'ya de GO! With Akiba PC Hotline!, Internet<URL:http://www.watch.impress.co.jp/donya/DN-13429.html>.

* cited by examiner

OPERATION ASSISTANCE APPARATUS FOR GAME CONTROLLER, AND OPERATION ASSISTANCE METHOD

CROSS-REFERENCES TO RELATED APPLICATIONS

This Application claims the benefit of priority and is a Continuation application of the prior International Patent Application No. PCT/JP2017/026046, with an international filing date of Jul. 19, 2017, the entire disclosures of all applications are expressly incorporated by reference in their entirety herein.

BACKGROUND OF THE INVENTION

1. Field of the Invention

The present invention relates to an operation assistance apparatus and an operation assistance method for a game controller which is connected to a computer system including a game machine and outputs an operation input signal to a game machine body in response to an operation input by a player.

2. Description of Related Art

In recent years, a household game machine is generally sold as a set including a game machine main body provided with a reading device for reading a game program from an optical medium such as CD-ROM or DVD-ROM and a control unit for performing arithmetic operations required for playing a game, and a game controller belonging to the game machine main body.

This belonging game controller is not specialized for a certain game genre, but generally designed to achieve flexibility and high operability for playing games in a variety of genres. Most of such a game controller is generally provided with grips to be held by an operator at the right and left ends of the game controller, a cross key arranged in the upper left surface while the operator holds these grips for inputting a direction, push buttons arranged in the upper right surface, and other input interfaces such as a joy stick, buttons arranged in the front face of the controller main body and the like. The operator can input various operation signals by holding the grips at the right and left ends with both hands, pressing the cross key and push buttons with both thumbs and manipulating the joy stick.

PRIOR ART LITERATURE

[Patent Document]
[Patent Document 1] Japanese Unexamined Patent Application Publication No. 2008-67844

BRIEF SUMMARY OF THE INVENTION

Problems to be Solved by the Invention

However, since the game controller as described above is operated by pressing the cross key and the push buttons and the like with thumbs, for example, there is a problem that a load is concentrated on the fingertip to cause the fingertip to be painful or form a callus. On the other hand, since the game controller as described above is configured to be held by holding the grips at the right and left ends with both hands, for example, there is a problem that the operator has to continue the same posture while playing a game to put a burden on the operator's body.

SUMMARY OF INVENTION

In order to solve the problem as described above, it is therefore an object of the present invention to provide an operation assistance apparatus and an operation assistance method for a game controller which is connected to a computer system including a game machine and outputs an operation input signal to a game machine body in response to an operation input by a player, wherein it is possible to reduce the load exerted on the fingers pressing down on a cross key or on push buttons of the game controller, inhibit the fingertip from being painful or forming a callus, and reduce physical burden on the player during playing a game.

Means to Solve the Problems

In order to accomplish the object as described above, the present invention is related to an operation assistance apparatus for assisting operation of a game controller which is disposed away from a game machine executing a game program and through which an operation signal is input to the game apparatus, the operation assistance apparatus comprising: a grip cushion arranged adjacent to operation parts of the game controller and mounted on a grip for holding the game controller, wherein the grip cushion is provided with a protrusion portion which is protruding upward on the upper surface side of the grip on which the operation parts are arranged.

The present invention related to an operation assistance apparatus for assisting operation of a game controller which is disposed away from a game machine executing a game program and through which an operation signal is input to the game apparatus, the operation assistance apparatus comprising: a holder unit configured to hold and fix the game controller and capable of adjusting an inclination angle of the game controller which is fixed; and a base to which the holder unit is fixed to extend upward.

The present invention related to an operation assistance apparatus for assisting operation of a game controller which is disposed away from a game machine executing a game program and through which an operation signal is input to the game apparatus, the operation assistance apparatus comprising: a magnifying glass which magnifies a screen outputted and displayed from the game machine.

In the case of the above invention, it is preferred that the grip cushion includes a curved surface continuously formed from a vertex of the protrusion portion to the operation parts in order that an extension line of a tangent in contact with all or part of the surface of the curved surface goes across the operation parts.

In the case of the above invention, it is preferred to further provide a flexible sound reduction member which covers at least the operation parts.

In the case of the above invention, it is preferred that the game controller is provided with a joy stick which is protruding upward from an upper surface of the game controller, and that a sound reduction member made of a resilient material is arranged surrounding the protruding portion of the joy stick.

In the case of the above invention, it is preferred to further provide a holder unit configured to hold and fix the game controller and capable of adjusting an inclination angle of the game controller which is fixed; and a base to which the holder unit is fixed to extend upward.

In the case of the above invention, it is preferred to further provide a base which fixes the game controller, and a cushion member connected to the base and made of a material having a shock-absorbing property.

In the case of the above invention, it is preferred to further provide a display unit which is detachably provided on the base and through which an article is detachably connected to the base.

In the case of the above invention, it is preferred to further provide a magnifying glass which is detachably provided on the base and magnifies a screen outputted and displayed from the game machine.

In the case of the above invention, it is preferred to further provide a signal receiving unit which is incorporated in the base to receive signals output from the game apparatus; and a control unit which controls an output device incorporated in or connected to the base in synchronization with the signals received by the signal receiving unit.

The present invention related to an operation assistance method for assisting operation of a game controller which is disposed away from a game machine executing a game program and through which an operation signal is input to the game apparatus, wherein a grip cushion is arranged adjacent to operation parts of the game controller and mounted on a grip for holding the game controller, and wherein the grip cushion is formed with a protrusion portion which is protruding upward on the upper surface side of the grip on which the operation parts are arranged.

The present invention related to an operation assistance method for assisting operation of a game controller which is disposed away from a game machine executing a game program and through which an operation signal is input to the game apparatus, wherein a holder unit configured to hold and fix the game controller is fixed to a base to extend upward, and an inclination angle of the game controller which is fixed is adjusted by the holder unit.

The present invention related to an operation assistance apparatus for assisting operation of a game controller which is disposed away from a game machine executing a game program and through which an operation signal is input to the game apparatus, the operation assistance apparatus comprising: a magnifying glass which faces and magnifies a screen outputted and displayed from the game machine.

In the case of the above invention, it is preferred that the grip cushion includes a curved surface continuously formed from a vertex of the protrusion portion to the operation parts in order that an extension line of a tangent in contact with all or part of the surface of the curved surface goes across the operation parts.

Effect of Invention

As has been discussed above, in accordance with this information, for an operation assistance apparatus and an operation assistance method for a game controller which is connected to a computer system including a game machine and outputs an operation input signal to a game machine body in response to an operation input by a player, it is possible to reduce the load exerted on the fingers pressing down on a cross key or on push buttons of the game controller, inhibit the fingertip from being painful or forming a callus, and reduce physical burden on the player during playing a game.

In addition to this, since the controller can be stably held, the operability is improved to enhance game skill improvement. Furthermore, in accordance with the present invention, it is possible to collect, on the base, the devices and items which are required to enjoy the game, easily build a compact gaming room, and further improve the entertainment value of the game.

DETAILED DESCRIPTION OF THE INVENTION (Components of an Operation Assistance Set)

Figure 1:
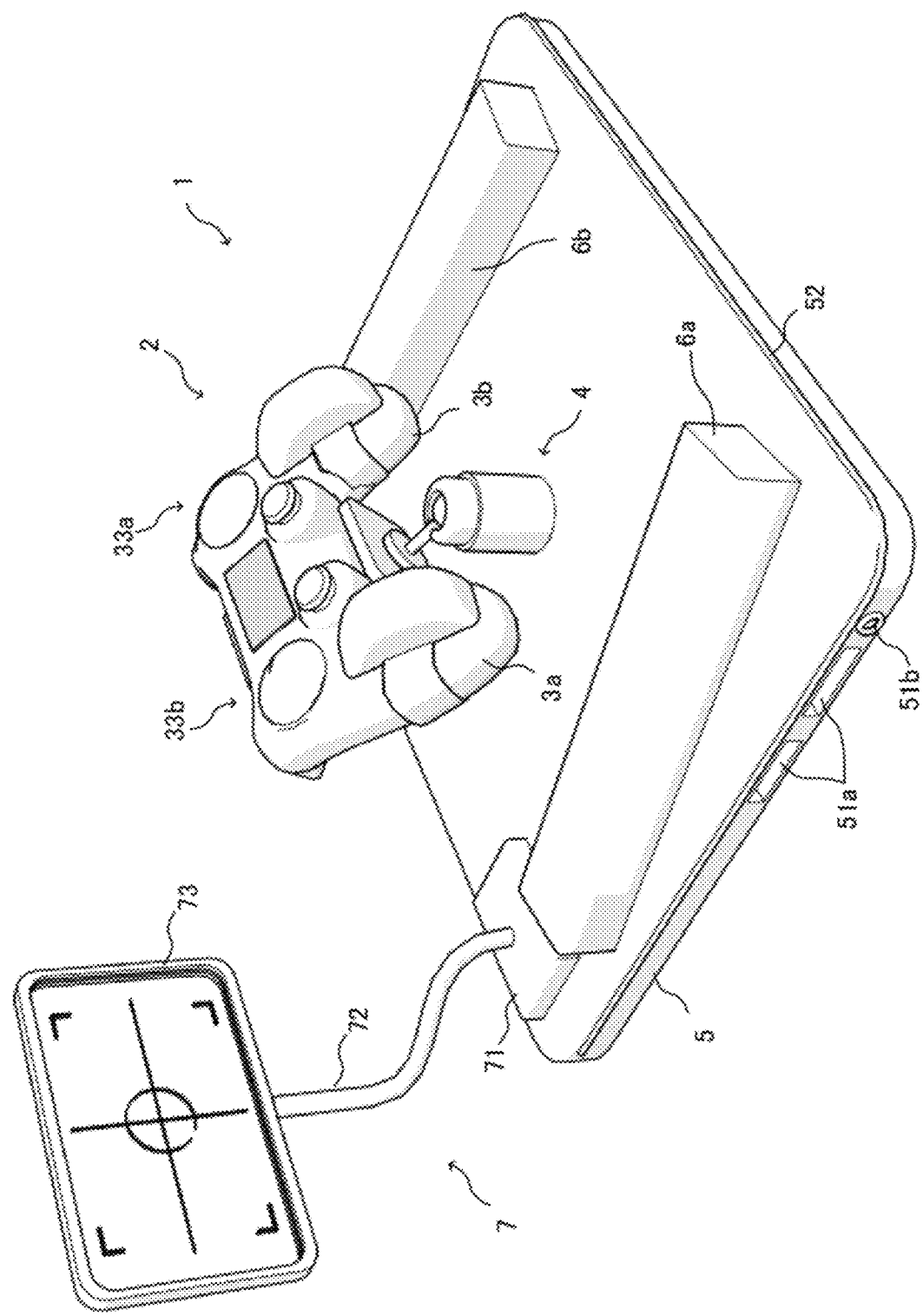
FIG. 1 is a perspective view from the diagonal rear for showing the outward appearance of an operation assistance set in accordance with an embodiment.
Figure 2:
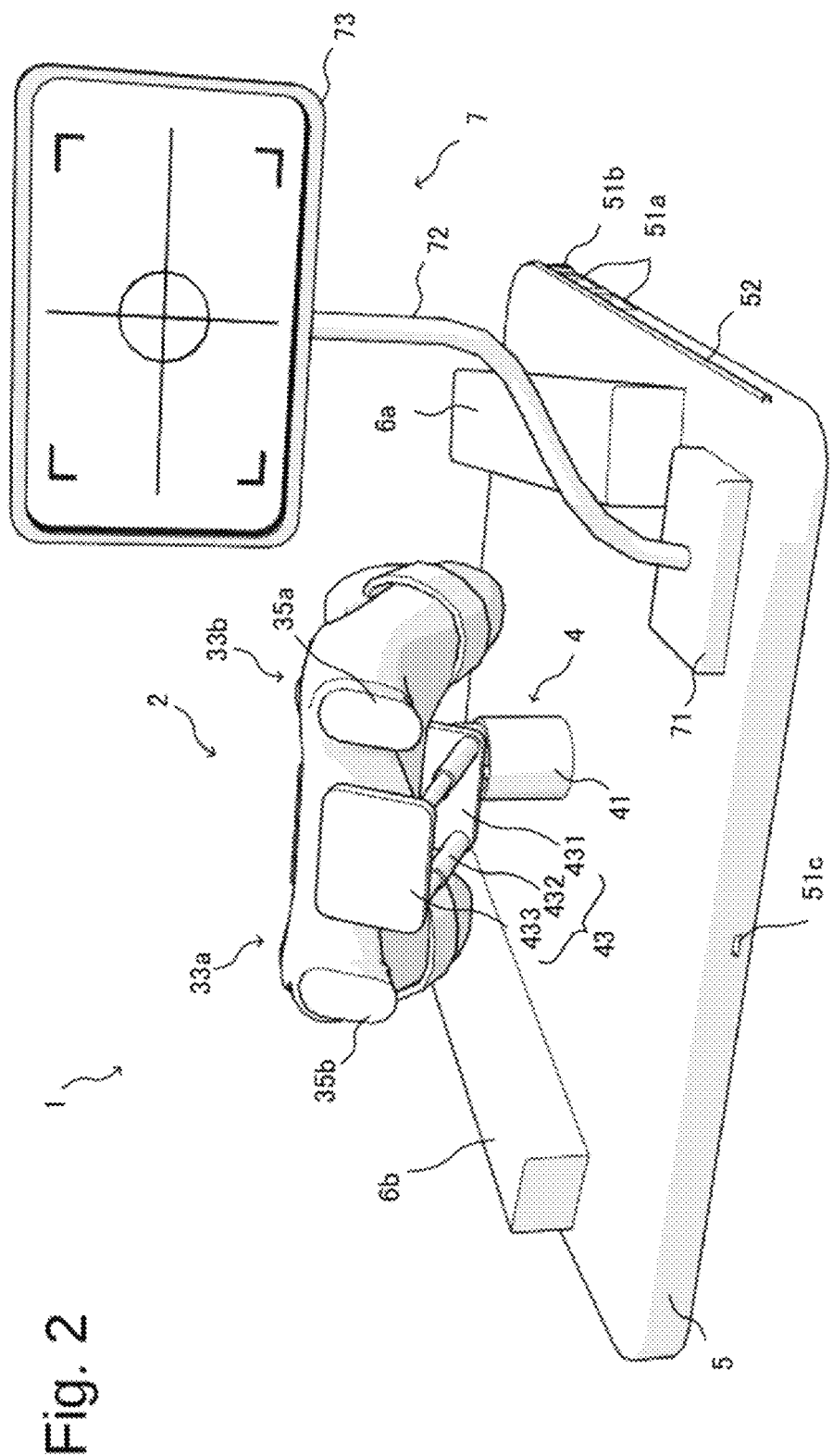
FIG. 2 is a perspective view from the diagonal front for showing the outward appearance of the operation assistance set in accordance with the embodiment.

In what follows, with reference to the accompanying drawings, an embodiment of a game controller operation assistance apparatus according to the present invention will be explained in detail. FIG. 1 and FIG. 2 are perspective views for showing the overall configuration of an operation assistance set according to the present embodiment, and FIG. 3 is an exploded perspective view for showing the operation assistance set according to the present embodiment.

In this case, a game controller 2 is a device which is disposed away from a game machine executing a game program and provided with a variety of input interfaces for receiving operation signals to be transmitted to the game machine in order that games in a variety of genres can be played. The game controller 2 is provided with grips 2*a* and 2*b* which are held by an operator at the right and left ends, a cross key 22 arranged in the upper left surface while the operator holds this grip for inputting a direction, push buttons 21 arranged in the upper right surface, and other input interfaces such as a pair of joy sticks 24a, 24b, right and left buttons 25a and 25b arranged in the front face of the controller main body and so forth. The operator can input various operation signals by holding the grips 2a and 2b at the right and left ends with both hands, pressing the cross key 22 and push button 21 with both thumbs and manipulating the joy stick 24a and 24b.

Figure 3:
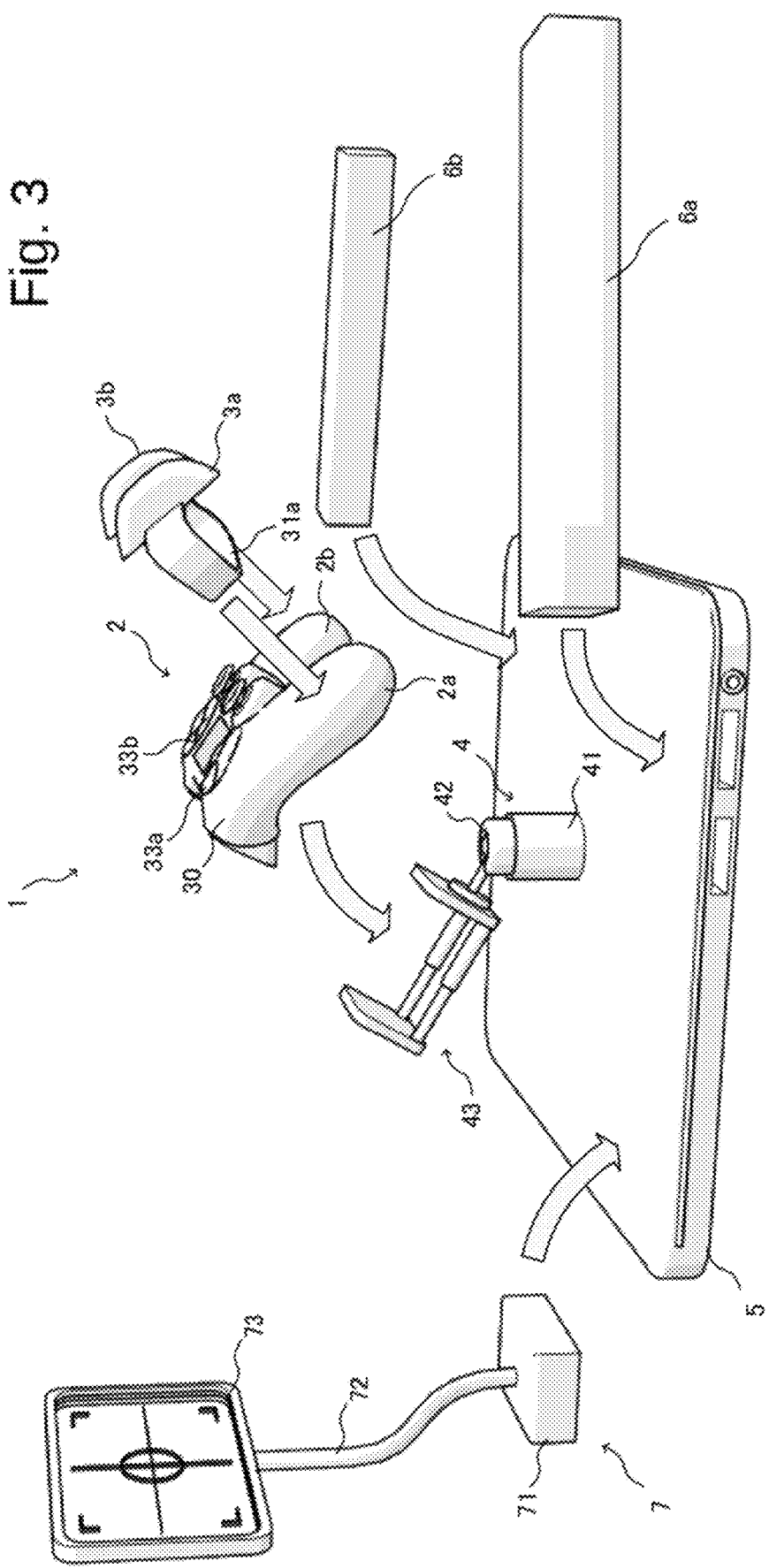
FIG. 3 is an exploded perspective view for showing the operation assistance set in accordance with the embodiment.

On the other hand, as illustrated in FIG. 1 to FIG. 3, the operation assistance set 1 according to the present embodiment is an assemblage consisting of tools and accessories for supporting operations of the game controller 2. The tools and accessories are detachably arranged on a pad 5 functioning as a base.

Figure 5:
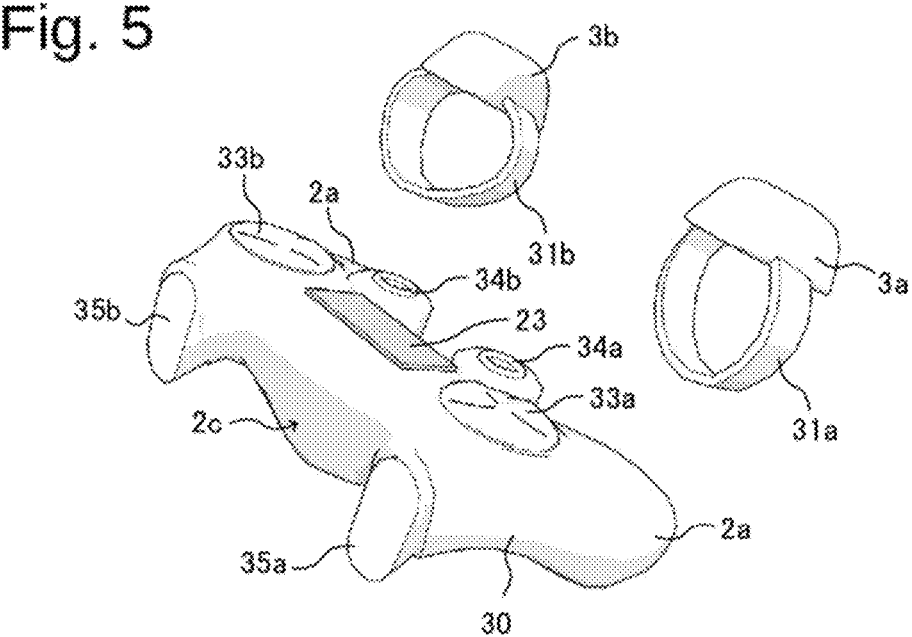
FIG. 5 is a perspective view for showing the operation assistance set from which grip cushions are separated in accordance with the embodiment.
Figure 6:
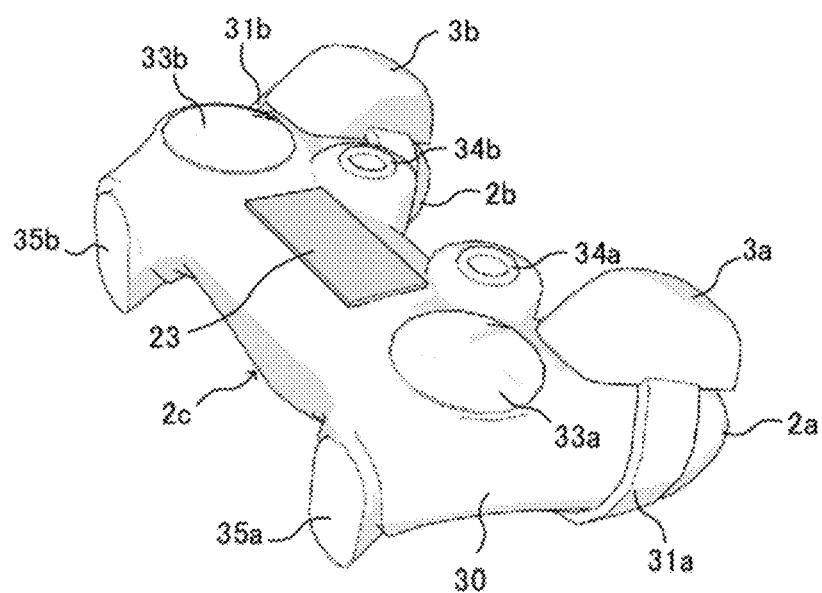
FIG. 6 is a perspective view for showing the operation assistance set to which the grip cushions are mounted in accordance with the embodiment.

The operation assistance set 1 includes grip cushions 3a and 3b which are detachably mounted on the grips 2a and 2b for holding the game controller 2 as illustrated writ large in FIG. 5 and FIG. 6. These grip cushion 3a and 3b are arranged adjacent to the operation parts (the cross key 22, the push buttons 21, or the joy sticks 24a and 24b) of the game controller 2, provided with protrusion portions 30a and 30b which are protruding upward on the upper surface side of the grips 2a and 2b on which the operation parts are arranged, and fixed to the grips 2a and 2b with belts 31a and 31b. Alternatively, the grip cushions 3a and 3b can be fixed to the grips 2a and 2b by various means such as a double-stick tape, a hook-and-loop fastener, an adhesive gel or the like.

The grip cushions 3a and 3b are made, for example, of a fabric (or waterproof fabric), a 100% cotton–10% cotton+polyester 90%, a fleece leather, a plastic, a rubber, a metal, a wood, a paper, a board, a silicone or the like material. Meanwhile, these grip cushions 3a and 3b can be fixed by various means such as a hook-and-loop fastener, a rubber tape, a rubber belt, a magnet, a sucker, a protruding and recessed fitting means, a bolt with a nut, a screw, a blanket fastening means, a socket means, an adhesive, a suturing means, a strap, a fastener, a tape, a double-stick tape, a belt, a bond, a strap or a capping means. Also, the grip cushions 3a and 3b can be designed in the form of an alphabetic character, a column—elliptic shape, a cuboid shape, or another shape such as a star shape or a globe shape, a square shape or a dome shape. Furthermore, these grip cushions 3a and 3b can be formed integrally with the controller main body (including a plastic case, a handling portion, a plastic cover).

Figure 7:
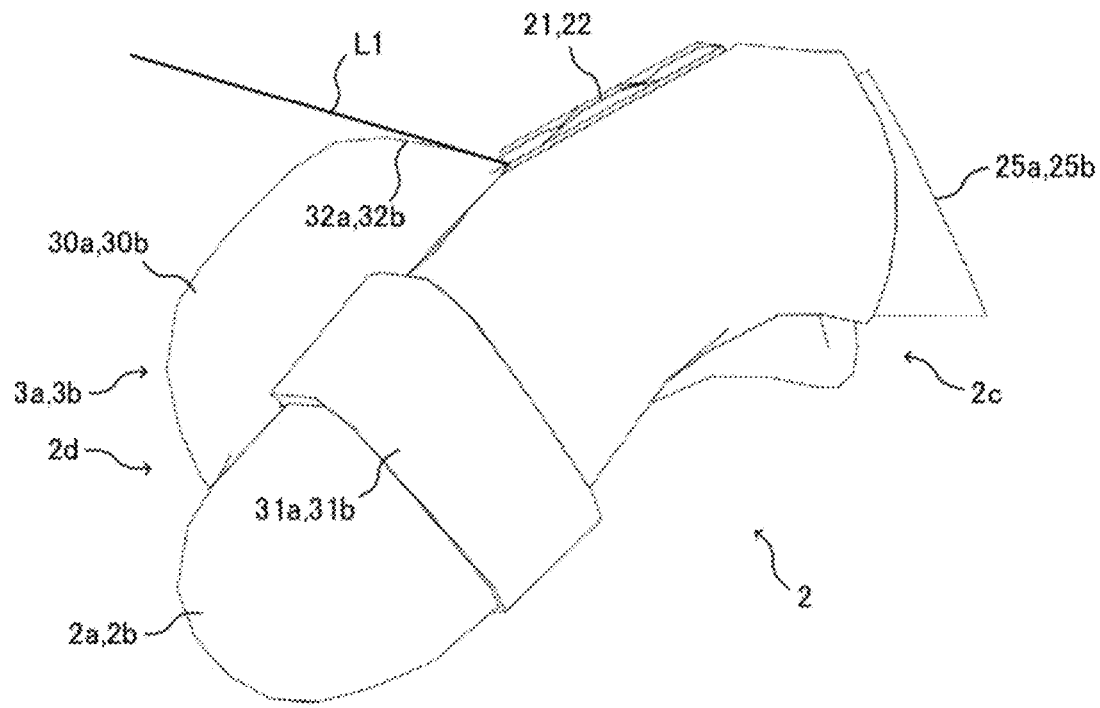
FIG. 7 is a side view for showing the configuration of the grip cushion in accordance with the embodiment.
Figure 8:
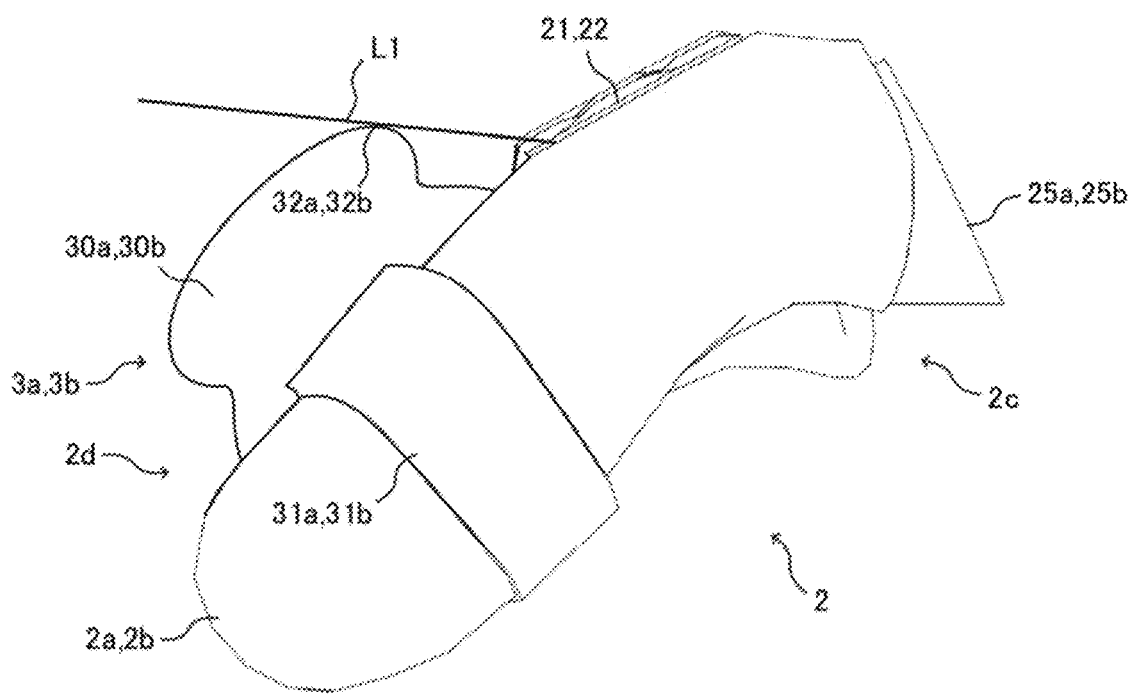
FIG. 8 is a side view for showing the configuration of the grip cushion in accordance with a modification example.

As illustrated in FIG. 7, the grip cushions 3a and 3b includes curved surfaces 32a and 32b continuously formed from the vertices of the protrusion portions 30a and 30b to the cross key 22 and the like operation parts in order that an extension line L1 of a tangent in contact with all or part of the surface of the curved surfaces 32a and 32b goes across the cross key 22 and the like operation parts. Incidentally, the grip cushions 3a and 3b can be designed in a various form, for example, in the form having a swelling as illustrated in FIG. 8. Also in this case, the grip cushions 3a and 3b includes curved surfaces 32a and 32b continuously formed from the vertices of the protrusion portions 30a and 30b to the cross key 22 and the like operation parts in order that an extension line L1 of a tangent in contact with all or part of the surface of the curved surfaces 32a and 32b goes across the cross key 22 and the like operation parts.

In addition to this, as illustrated in FIG. 5 and FIG. 6, the entirety of the game controller 2 is covered with a cover 30 made of a silicone. This cover 30 includes flexible sound reduction covers 33a and 33b covering the cross key 22, the push buttons 21 and the right and left buttons 25a and 25b which are operation parts. Furthermore, this cover 30 is provided with sound reduction rings 34a and 34b which are sound reduction members arranged surrounding the protruding portions of the joy sticks and made of a resilient material. These sound reduction covers 33a, 33b and sound reduction rings 34a and 34b can be made not only of a silicone but also of a synthetic resin such as a plastic, a rubber or a film. Incidentally, this cover 30 may include protection covers separately covering the buttons and the like, which tend to be touched by mistake, such as a reset button, a home button and the like arranged on the surface of the game controller 2.

The pad 5 as described above is a plate-like base for fixing the game controller and can be made, for example, of a fabric (or waterproof fabric), a cotton, a polyester, a fleece leather, a plastic, a rubber, a metal, a wood, a paper, a board, a silicone, a glass or the like material. Also, the pad 5 as illustrated in the figure can be shaped in the form, not only of a rectangular thin plate, but also of an extra thick plate, an alphabetic character, an alphanumeric character, a numeric character, a katakana, a column—elliptic shape, a cuboid shape, a globe, a square shape, a dome shape or another figure.

In addition, the pad 5 can be designed to be capable of being folded in two or four for carrying and storage, being separated into two to four, being freely assembled in longitudinal and lateral directions as a puzzle assembly, and being wound up into a cylinder by making it of a flexible material. Furthermore, the pad 5 may be sized to conform to the standard of a household game machine in order that the pad 5 can be docked with a game machine for storage.

Figure 13:
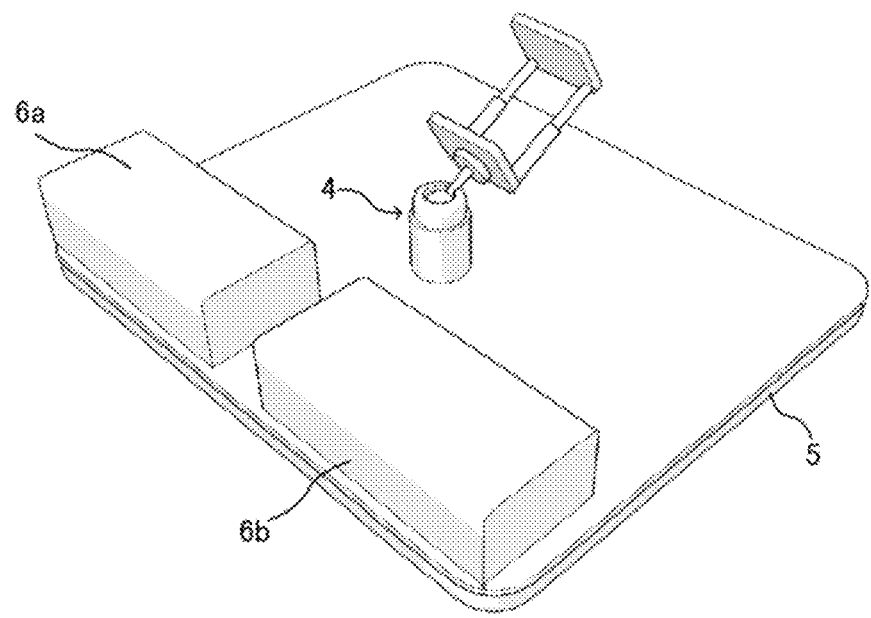
FIG. 13 is a perspective view for showing the operation assistance set to which cushions are mounted in accordance with a modification example.
Figure 14:
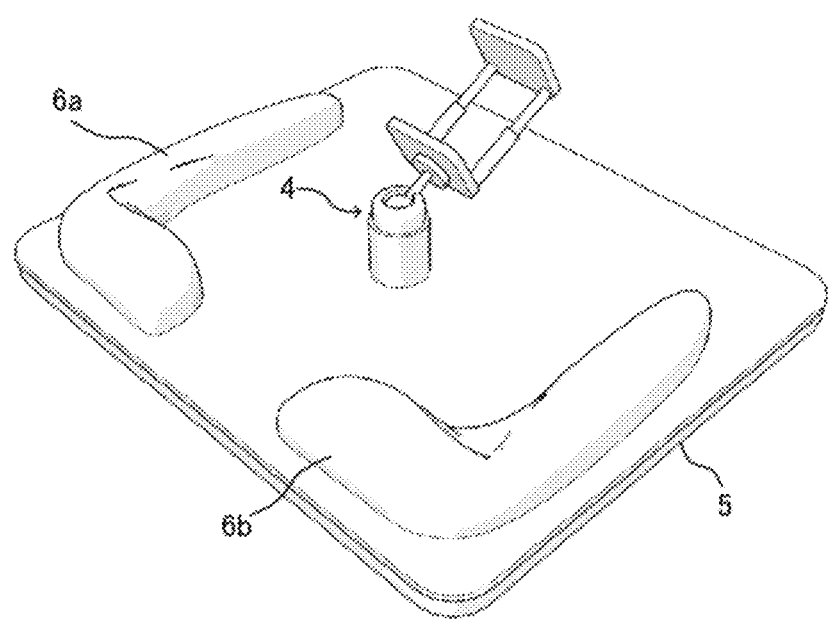
FIG. 14 is a perspective view for showing the operation assistance set to which cushions are mounted in accordance with a modification example.

Furthermore, the entire upper surface of the pad 5 is covered with a cushioning member having a shock-absorbing property on which a hook-and-loop fastener is arranged so that an accessory can be detachably fixed to an arbitrary position thereof. In the case of the present embodiment, a pair of cushions 5a and 5b are provided on the rear end of the upper surface of this pad 5 and connected to this pad 5 through the hook-and-loop fastener. These cushions 5a and 5b are made of a shock-absorbing material and shaped in a slender rectangular form in the case of the present embodiment. Alternatively, as illustrated in FIG. 13 and FIG. 14, these cushions 5a and 5b can be designed in a variety of forms and sizes, for example, a thickish rectangular form, an L-shaped form and the like.

On the other hand, the bottom and side surfaces of the pad 5 can be provided with a joint with which the pad 5 jointed, for example, on an armrest of a seat chair, a bucket type chair, a rocking chair or the like. By this configuration, the set can be used as a set of a racing chair (incorporating a speaker) and a table. Meanwhile, furthermore in this case, the operation assistance set 1 may be engaged with a compact table capable of supporting a PC keyboard and being opened and closed in the right or left direction of an armrest, and designed to be fixed after adjusting the angle and height together with the table.

Figure 4:
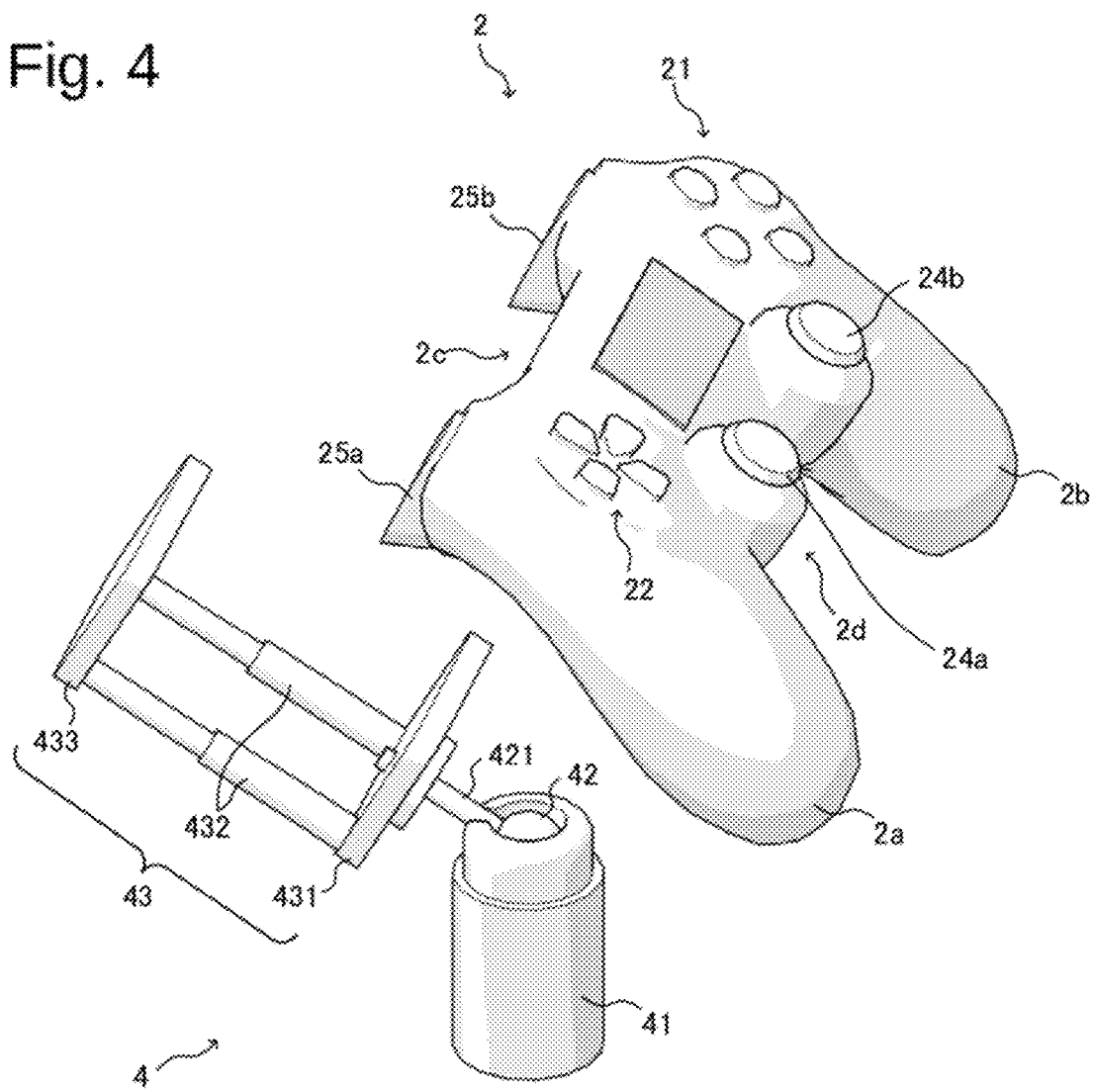
FIG. 4 is a perspective view for showing a holder mechanism in accordance with the embodiment.

A holder unit 4 is arranged to hold and fix the game controller 2. This holder unit is fixed to the pad 5 to extend upward. As illustrated writ large in FIG. 4, this holder unit 4 is provided with the functionality of adjusting the height, orientation and inclination angle of the game controller which is fixed.

This holder unit 4 has a pedestal member 41 which is projected upward from the pad 5, and a ball joint member 42 which is disposed on the upper portion of this pedestal member 41 to horizontally rotate and vertically pivot. A grasping unit 43 is supported by this ball joint member 42 through a shaft member 421. This grasping unit 43 includes a lower end member 431 connected to the shaft member 421 and an upper end member 433 connected to the lower end member 431 through a telescopic unit 432. The distance between the upper end member 433 and the lower end member 431 can be adjusted by expansion and contraction of the telescopic unit 432 to hold the game controller 2 by grasping a front end 2c and a lower end 2d of the game controller 2 between the upper end member 433 and the lower end member 431. The game controller 2 grasped by the grasping unit 43 can be changed in its orientation and angle by rotation and vertical pivoting of the ball joint member 42.

Also, in the case of the present embodiment, a magnifying glass 7 is detachably set up on the pad 5. This magnifying glass 7 includes a lens member 73 which magnifies the screen outputted and displayed from the game machine. This lens member 73 is supported by a flexible pipe 72 which can be flexibly bent, and detachably fixed to the pad 5 through a pedestal 71. This lens member 73 and the flexible pipe 72 can be made of a synthetic resin such as a plastic, a rubber, a metal, a paper, a glass or the like material. Meanwhile, in the case of the present embodiment, a mark such as a target scope is displayed in the lens member 73. Also, this lens member 73 may be provided with an illumination device such as an LED and an oscillator in order that the lens member 73 is illuminated and oscillated in synchronization with game outputs by a control unit to be described below.

In addition, the pedestal 71 can be fixed to the pad 5 by means of a clip, a wire clip, a stand clip, a magnet, a sucker, a protruding and recessed fitting means, a bolt with a nut, a screw, a blanket fastening means, an adhesive tape means, or a double-stick tape. Incidentally, while this magnifying glass 7 is placed on the pad 5 in the case of the present embodiment, this magnifying glass 7 can be directly attached to a display device in which a game screen is displayed.

Figure 12:
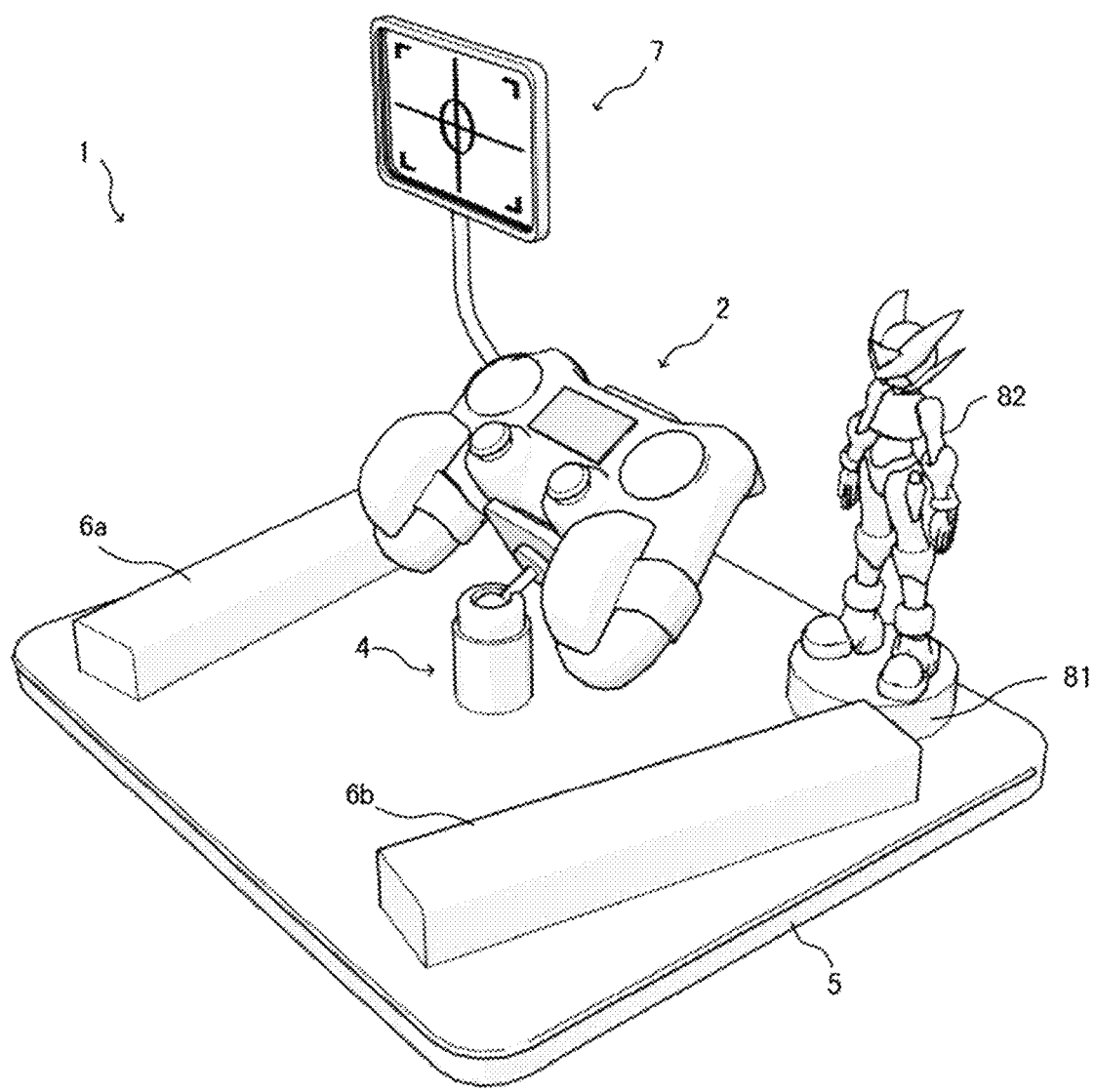
FIG. 12 is a perspective view for showing the outward appearance of an operation assistance set in accordance with a modification example.

Furthermore, as illustrated in FIG. 12, a display stand 8 is detachably placed in an arbitrary position on the pad 5. This display stand 8 can be fixed to an arbitrary position on the pad 5 for detachably connecting an ornament such as a FIG. 82 or a personal item such as a must-have to the pad 5.

Next, a second embodiment of the present invention will be explained in detail. Meanwhile, the present embodiment will be explained in the case where the pad 5 is provided with synchronization functionality with a game machine. Meanwhile, in the description of the present embodiment, like reference numbers indicate functionally similar elements as the above embodiment unless otherwise specified, and therefore no redundant description is repeated.

(Sound Effects/Video Output Function)

Figure 9:
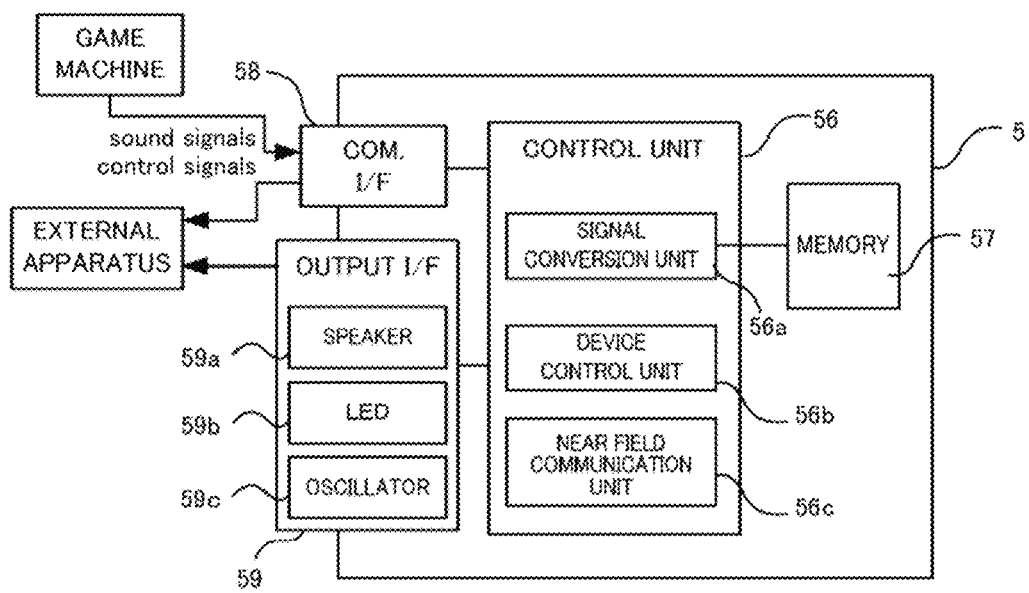
FIG. 9 is a block diagram for showing the internal structure of a pad in accordance with the embodiment.

The pad 5 according to the present embodiment is provided with a function to turn on a LED 52, output sounds from a built-in speaker and output vibration in synchronization with sound signals, video signals, control signals and the like output from a game machine. FIG. 9 is a schematic diagram for showing the internal structure of the pad 5 in accordance with the present embodiment. The pad 5 according to the present embodiment incorporates an arithmetic processing unit, e.g., a CPU or the like, as a control unit 56 which receives signals output from a game machine, converts the signals, controls output devices incorporated in or connected to the base in synchronization with the signals output from the game machine.

The output devices includes, for example, a speaker 59a for outputting sounds, a luminescence device such as an LED 59b, an oscillator 59c for outputting vibration and the like, and the control unit 56 controls outputs of rumbling, lighting and the like through an output interface 59. The control unit 56 outputs rumble, lighting, sounds and the like in synchronization with sound signals, control signals and the like input from the game machine. Incidentally, this speaker 59a may incorporate a surround function, a surround system, a sound card and the like in compliance with to 2.0ch or higher, 5.1ch, 7.1ch.

Figure 11:
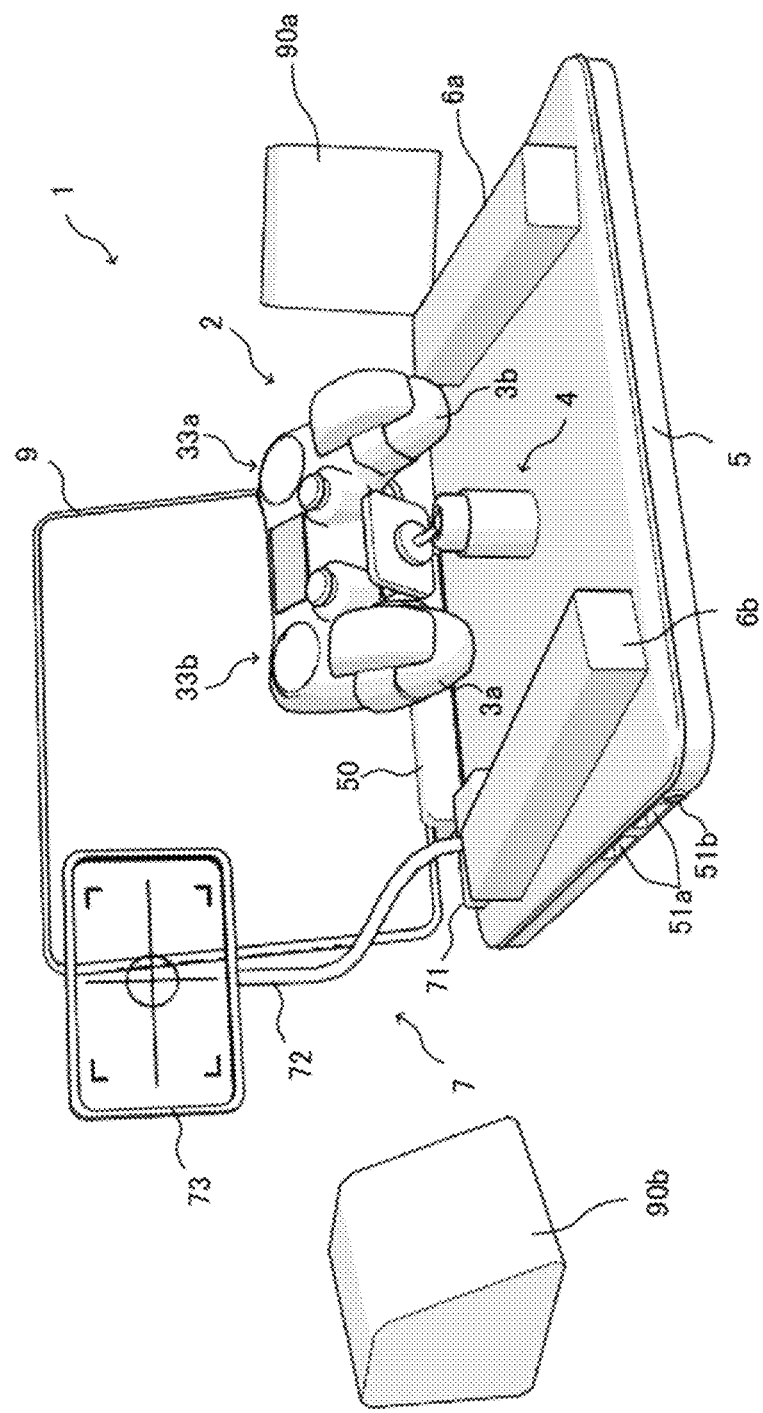
FIG. 11 is a perspective view for showing the outward appearance of an operation assistance set in accordance with a modification example.

In addition, this output devices includes an information processing apparatus, e.g., a tablet PC 9 as shown in FIG. 11. It is possible to output videos, sounds and the like in synchronization with various signals such as sound signals, a control signals and the like input from the game machine by executing an application on this tablet PC to connect with the control unit 56 by a wireless or wired channel through a communication interface 58 and the output interface 59. Furthermore, in the case of the present embodiment, external speakers 90a and 90b are connected as external output devices to output sounds by transmission of sound signals through wireless communication such as Bluetooth (registered trademark).

As illustrated in FIG. 9, the pad 5 according to the present embodiment incorporates output devices such as the speaker 59a, the LED element 59b, the oscillator 59c and the like together with the control unit 56 for controlling these output devices. Specifically, the pad 5 incorporates the communication interface 58, the output interface 59, the control unit 56 and a memory 57. Incidentally, in the following description, the term "module" is intended to encompass any function unit capable of performing necessary operation, as implemented with hardware such as a device or an apparatus, software capable of performing the functionality of the hardware, or any combination thereof.

The control unit 56 is an arithmetic processing unit of a CPU on which firmware loaded on the memory 57 is executed to virtually build various function modules which perform signal conversion and device control. The memory 57 is a nonvolatile storage device for storing the above firmware, various setting data, a signal conversion table and the like.

The communication interface 58 is a module for transmitting and receiving signals and data to and from this control unit 56 through a wireless or wired channel such as an audio input terminal or Bluetooth (registered trademark). Incidentally, this communication interface 38 includes a wireless LAN such as Wifi, a near field communication such as Bluetooth (registered trademark), a wireless communication such as a 3G system, a USB input terminal 51c, an optical digital input/output system, a predetermined protocol such as a wired LAN, and a wired communication for transmitting sounds, videos and the like through an audio cable or the like. Also, in the case of the present embodiment, sound signals can be transmitted to the external speakers 90a and 90b by a wireless communication such as Bluetooth (registered trademark) through this communication interface 58 to output sounds from the external speakers 90a and 90b.

The output interface 59 is a module for outputting sound signals, control signals and the like to the outside in the present embodiment, and includes a speaker 39a for outputting sounds, an LED 39b for emitting light, an oscillator 59c for outputting vibration to output sounds such as sound effects and a message, lighting, blinking, color variation of the LED, and so forth. Other output interface 39 includes a USB terminal 51a, an audio terminal 51b, a video terminal and other means for transmitting signals and data to other apparatuses.

(Configuration of the Tablet PC)

Figure 10:
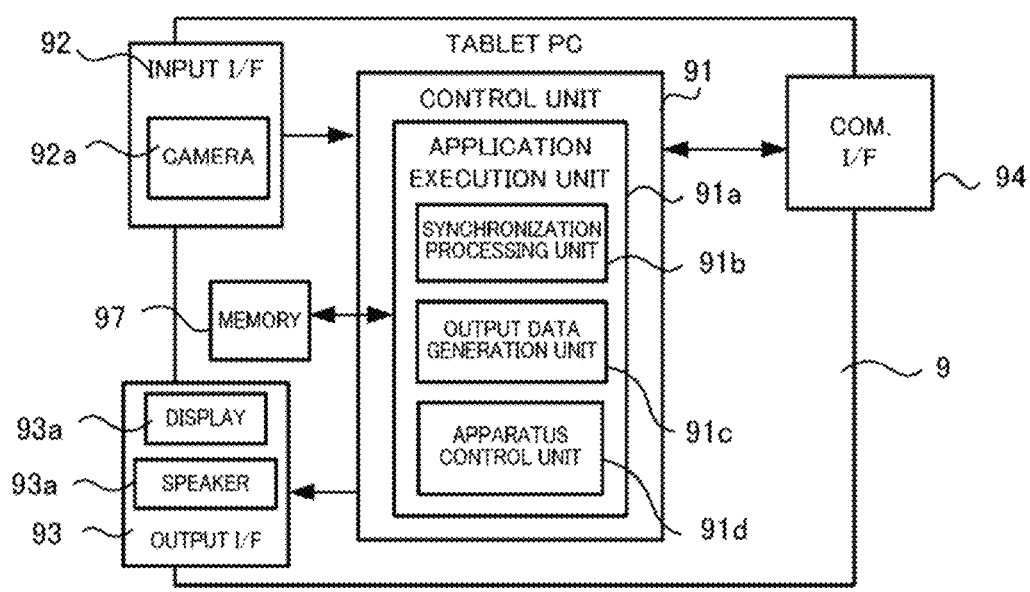
FIG. 10 is a block diagram for schematically showing the internal structure of a tablet PC in accordance with the embodiment.

Next, the internal structure of the tablet PC 9 will be explained. FIG. 10 is a block diagram for showing the internal structure of the tablet PC 9, and FIG. 11 is a perspective view for showing the tablet PC 9 which is set up. In the case of the present embodiment, the tablet PC 9 is set up through a stand 50 which is provided separately from or integrally with the pad 5 to face an operator.

The tablet PC 9 is an arithmetic processing unit which executes a predetermined computer program to perform information processing, and can wirelessly communicate with a general wireless base station or the like so that a user can receive communication services such as telephone conversation, data communication and the like during movement. Also, various functions can be implemented by executing predetermined applications. Specifically, the tablet PC 9 is provided with, as basic components, a control unit 91, a memory 97, a communication interface 94, an output interface 93 and an input interface 92.

The communication interface 94 is a module for performing the transmission and reception of data to/from other communication devices. The communication system thereof includes, for example a 3G system, an FDMA system, a TDMA system, a CDMA system, a W-CDMA system, the PHS (Personal Handyphone System) and the like, and also includes wireless communication such as a near field communication, e.g., Bluetooth (registered trademark), USB connection, and wired communication based on a predetermined protocol such as a wired LAN.

The output interface 93 is provided with a display unit 93*a* such as a liquid crystal display incorporating a touch panel to display images and motion pictures generated by an output data generation unit 91*c*. On the other hand, the output interface 93 includes a speaker which outputs sounds, an LED which emits light and the like, and also includes a means for transmitting data signals to other apparatuses through a USB terminal and sound/video terminals. The input interface 92 includes a touch panel, a keyboard and operation buttons, and also includes a camera 92*a* and an acoustic microphone for taking images/videos and the like. Meanwhile, these output interface 93 and input interface 92 include a microphone input terminal, a display port cable terminal, an adapter, a VGA connector, a D-SUB mini 15 pin connecting terminal, an RGB terminal, a splitter terminal and the like terminal.

The control unit 91 is an arithmetic processing unit of a CPU on which an OS, application programs, firmware and the like loaded on the memory 97 is executed to virtually build various function modules. The memory 97 is a non-volatile storage device for storing the above OS, application programs, firmware, various setting data, application data, and user data.

This control unit 91 virtually builds an application execution unit 91*a* for executing applications. This application execution unit 91*a* is a module for executing applications such as a general OS, browser software and a media viewing application. Meanwhile, in the case of the present embodiment, this application execution unit 91*a* virtually builds a synchronization processing unit 91*b*, an output data generation unit 91*c* and an apparatus control unit 91*d* on the CPU, for example, by executing a synchronization application.

More specifically, the synchronization processing unit 91*b* synchronizes the signals from the game machine and the like to generate sound effects and videos which are output through the apparatus control unit 91*d* by acquiring sound signals, video signals and control signals from the control unit 56 of the pad 5 and the game machine through the communication interface 94 and the input interface 92, and generating output data by the output data generation unit 91*c* in synchronization with these signals.

(Operation Assistance Method)

The operation assistance method of the present invention can be implemented by making use of the operation assistance set 1 having the structure as described above.

First, an operator holds the grips 2*a* and 2*b* with both hands at the right and left ends, places right and left thumbs respectively on the curved surfaces 321 of the right and left grip cushions 3*a* and 3*b* installed on the grips 2*a* and 2*b*, and adjusts the positions of the both thumbs along the extension lines of the tangents 322 in contact with the surfaces of the curved surfaces 321 for operating the cross key 22, the push buttons 21, the joy sticks 24*a* and 24*b* and the like with the both thumbs. By this configuration, the pressing force during operating the operation parts can be dispersed into the grip cushions 3*a* and 3*b* to reduce concentration of the pressing force on the fingertips. Furthermore, in the case of the present embodiment, there are the cover 30 made of silicone covering the entirety of the game controller 2, the sound reduction covers 33*a* and 33*b* covering the cross key 22, the push buttons 21 and the right and left buttons 25*a* and 25*b* which are operation parts, and the sound reduction rings 34*a* and 34*b* arranged surrounding the protruding portions of the joy sticks 24*a* and 24*b*.

On the other hand, in this case, the game controller 2 is grasped by the holder unit 4 to fix the game controller 2 at an arbitrary angle and orientation. Since the game controller 2 is fixed by this holder unit 4 in a predetermined height position, the operator can take easy posture without applying any excessive force only by putting both hands on the grips 2*a* and 2*b* and placing both thumbs on the grip cushions 3*a* and 3*b*. Furthermore, both elbows can rest on the grip cushions 5*a* and 5*b* to lessen the burden on the elbows by arranging the pair of the grip cushions 5*a* and 5*b* in the position of the elbows with the both hands being put on the game controller 2. In addition, the FIG. 82 is arranged on the pad 5 as an ornament through the display stand 8.

Furthermore, in the case of the present embodiment, the magnifying glass 7 is placed on the pad 5. In this case, it is possible to view information of a game screen displayed on a television screen, as an expanded view, even in the posture in which elbows rest on the cushions 5*a* with both hands being placed on the fixed game controller 2, by adjusting the height position and orientation of the lens member 73 through the flexible pipe 72.

Modification Example

Incidentally, the above explained embodiments show only examples of the present invention. Because of this, the present invention is not limited to the above embodiment, and various modifications are possible in accordance with the design and so forth without departing from the technical spirit of the invention. For example, multi-functionality can be attained by incorporating an electric apparatus in the pad 5 or externally adding an electric apparatus to the pad 5 through a connection terminal such as a USB terminal. This electric apparatus can be regarded as one of articles such as an ornament placed through the display stand 81, and can be selected from among a built-in electric apparatus connected through USB or the like, a speaker, a lighting apparatus such as an LED, a cable jack, a liquid crystal terminal, a battery, a clock, a plastic model, a glass, a table, a foot skeletal structure and the like.

The above electric apparatus includes a communication equipment and a relay device compatible with LAN, Wi-Fi, Bluetooth (registered trademark), RCA optical line HDMI (registered trademark), DVI, VGA terminal, one-segment, NFC (near field wireless communication), VDSL line and so forth. Also, the built-in electric apparatus includes a built-in USB apparatus, a built-in speaker, a built-in LED, a built-in cable jack, an optical cable built-in apparatus, a modular jack, a USB serial converter, an USB adapter, an LED tape, a VGA cable, a magnet terminal, a pin cable, a microcable, a lightning cable, a transfer cable, a mobile battery set, an adapter conversion connector, a built-in camera incorporating a clock, an S terminal cable, a D terminal (sound, video), a telephone cable, a television tuner, a wireless LAN, a wireless LAN modem slave unit, a 4K, 5K compatible apparatus, a 3D, 4D compatible apparatus, a LAN outlet, a power supply outlet, a modular plug, a DC plug, a lightning terminal, an earphone terminal, a Y-lug terminal, a lightning conversion connector, a USB hub, an RCA jack, an RCA cable, an RCA connector, an RCA plug, a BNC jack, a BNC cable, a BNC connector, a BNC plug, a TRS jack, a TRS cable, a TRS connector, a TRS plug, a DC jack, a DC cable, a DC connector, a DC plug, a modular jack, a modular cable, a modular connector, a modular plug, a LAN jack, a LAN cable, a LAN connector, a plug conversion adapter, a conversion connector, a conversion cable, an audio conversion cable, a memory card, an IC chip card, an OV chip card, a sim card, an IC function SD card, a hard disk, a blue ray, a DVD, a CD, a CD-R, a SSD, a floppy, an MD audio output, a video output, a speech recognition function, a finger print recognition function, a vibration recognition function, a security function, a touch panel, an infrared ray sensor, an automatic sensing system, a B-CAS, a high-resolution, a wallet function, a traffic system electronic money, a voice earphone, a video earphone, a hub, a power switch and so forth.

On the other hand, the power supply used for the aforementioned apparatus includes a dry cell, a rechargeable cell, an alkaline cell, a lithium cell, a hydrogen cell, a solar cell, a mobile cell, a sodium ion cell, a lithium ion cell, a dual carbon battery cell, a lithium air cell, a nickel hydrogen cell, a nickel cell, a lithium polymer cell, a mobile cell, a battery, a rechargeable battery, an alkaline battery, a hydrogen battery, a lithium ion battery, a sodium ion battery, a dual carbon battery, a solar panel, a nickel hydrogen battery, a lithium air battery, a nickel battery, a lithium polymer battery, a mobile battery case-type battery, battery, an exchangeable battery, a lithium battery, a solar battery, a mobile battery, a solar charger, a solar panel, a mobile charger, an AC-type charger, a DC-type car charger, and a cradle dock.

Also, the game accessory connected through the above relay device or terminal incorporated in the pad 5, the cushions 5a and 5b and the like includes a gaming mouse, a gaming keyboard, a headphone, voice chat, a microphone, a mouse, a keyboard, a speaker, a sound bar, a mini-keyboard connected to the controller, a car steering wheel game control, a gaming control, a USB game control, a wireless remote control game pad, a game control game pad, a VR camera, an arcade stick, a game pad console joystick pad, game pad converter USB, a VR charger stand, a PS4 vertical/horizontal type stand, a various charger stand, a vertical/horizontal type stand for game machine, a various charger stand and so forth.

Furthermore, the external apparatus connected to the apparatus incorporated in the pad 5, the cushions 5a and 5b and the like includes an external display, an analog monitor, a projector, a liquid crystal display, a liquid crystal tablet terminal, a liquid crystal television, a mouse pad, a mouse, a key board, a keypad, a network audio system, a smartphone, a network radio, mail, LINE, SNS, a mouse and a key board, a vertical/horizontal type device, a charge stand, a key board with a liquid crystal, a mouse with a liquid crystal, and a keypad with a liquid crystal.

Furthermore, the apparatus connected to the device, the power supply and the like incorporated in the pad 5, the cushions 5a and 5b and the like includes a humidifier, an air cleaner, an electric fan, a warm air heater, an aroma function, a vape function, a stereo function, a radio function, a timer function, electronic calculator, a calendar function, a walk man, a voice recorder, a built-in voice recorder, a music tablet, a portable player, a compact stereo, a remote control, a multifunctional remote control, a digital camera, a cellular phone, a telephone, a FAX, a power supply unit, a copy machine, a printer, a scanner, a digital photo, a sound function, an adapter, an AC power supply connectable device, a timer function, a video recording function, a radio clock, a DVD player, a DVD recorder, a CD Player, an AV amplifier, an AV receiver, a speaker, a book shell speaker, a mobile television tuner, a cigar socket, an in-vehicle charger, an in-vehicle USB, an in-vehicle battery, an LED fluorescent lamp, a USB LED tape light, a USB LED light, an LED lamp, a cooler box, a health meter, a shredder, an electronic dictionary, a label writer, a laminator, a digital compass, a wireless non-contact charging apparatus, a lamp, a drone, a cooled gel, a cooling fan and the like.

Furthermore, the kinds of toys, the daily necessities and the ornaments incorporated in or connected to the pad 5, the cushions 5a and 5b and the like includes a model, a diorama, a figure, a food toy, a miniature car, a Plarail toy train, a Gacha Pon product, a stuffed toy, a drawing sheet for coloring, a picture book, a rubber doll, a soft vinyl doll, a dress-up doll, an animal figure, the theme of 'squadron', a block toy, an ornament of a game character, plastic bricks, a squadron weapon, a metamorphic toy, an air gun, a survival game, a print club photo booth, a growing game, a juice, a glass, an ash pan, a tobacco, a lighter, a storing case, a stationery product storing case, an accessory storing case, a sticker, a seal, a wappen, a strap, a key holder, a puzzle, a board game, a card game, a soft vinyl toy, a world map, a calendar, a diary, beads, spangles, a national flag, space, a flower, a plant, an animal, a human being, a scenery, an article, comics, a building, a vehicle, a photogenic subject like a character, a thing represented by drawings, graphics, 3D, CG or the like, a one-point mark of an emblem, a national flag, a skull or the like, a thing with a pictographic script, a symbol, a writing body, an alphabetic character, a numeric character, a katakana, a hiragana, a Chinese character or the like, an ornament made of gold, silver, platinum, Swarovski or the like, an original pad cover made of a plastic, a rubber skin, a fabric, all types (including a waterproof material), a bug for pad, a case for pad, a various parts cover, a bug, a case, an article connected to the rear surface of the pad, a one-touch connectable article, a chair with a built-in speaker, a chair, a seat chair, a gaming chair, a table, a table only with foldable legs such as alphabet-shape, katakana-shape or numeric-shape legs, a table and chair set, a table and seat chair set, a table and gaming chair set, a cushion, a mat, a tire (with a lock), a caster (with a lock) and the like.

Other items incorporated in or connected to the pad 5 and the cushions 5a and 5b include a next generation battery, a next generation household game machine, a next generation connection jack, and the capability of charging a smartphone only by placing the smartphone on the pad (including the configuration to charge through cable connection such as USB or the like). The pad on which an elbow rests may be in the form of a U-shape, an individually separated type (two through four types or the like). Furthermore, the LED light to be connected may be controlled to change in color and brightness, turn on/off and blink, for example, by a switch or the like, or variously change the way of lighting in synchronization with the output sounds of a game and the volume of music, together with a speaker, a woofer or the like which output sounds.

The structure of the grasping unit 43 includes a vertically and horizontally movable 360 degree rotatable type with lock, a height/angle adjustable type, a fixing type, a magnet type, a sucker type, a fit type, a sliding type, a hook type, a storing type, a camera tripod type, a fixing type, a sucker type, a sewn type, a pressure contact type, a welding type, a protruding and recessed fitting type, a Magic Tape (registered trademark) type, a rubber band type, a leather belt type, an adhesive type, a bonding type, a strap type, a fastener type, an adhesive tape type, a double-stick tape type, a belt type, a capping type, a bolt and nut type, a screw type, a plastic screw type, a blanket type, a socket type, a spring type, an original processing type, a button type, a rivet type, a rubber button type, a clip rivet type, a buckle type, an arm stand clip type, a cable holder type, a cable clamp clip type, a wire clip type, a rack clamp type, and stand clip type.

Furthermore, the structure of the grasping unit includes a plate and clamp type in the form of any alphabetic character, a katakana character or a numeric character, an attachment holder type, a holder type, a multi-attachment type, a free holder type, a tablet holder type, a liquid crystal holder type, a digital camera holder type, a smartphone holder type, a camera holder type, a mount holder type, an audio part holder type, a holder clip type, a plate attachment type, a plate holder type, a control clip holder type, a control clip type, a juice holder/attachment type, an attachment holder type, a smartphone holder type, a holder clamp type, a monitor arm type, a monitor stand type, a smartphone stand type, an attachment and holder type in the form of any alphabetic character, an alphanumeric character, a katakana character or a numeric character, a microphone stand type, a voice chat type, a headphone stand type, a control attachment and holder type, a cigar attachment and holder type, a vertical/horizontal gaming machine, a stand attachment and holder type, a vertical/horizontal mouse and key board, a stand attachment and holder type, a PC arm type, a monitor type, a next generation attachment and holder type, an original workpiece type and the like.

In addition, the power button of the main body can be prevented from being pressed in error during playing a game by attaching or appending a protrusion accessory surrounding the button to cover the button which is usually exposed. Furthermore, since small optional buttons in the right and left sides of the controller is usually flat and thereby hard to press, a protrusion accessory is attached or appended to make it easy to press the small optional buttons. These protrusion accessories can be formed integrally with the cover 30. Still further, the grip cushions 3a and 3b can be formed with ruggedness to improve the grip, formed with holes to enhance the design quality, made of a material having contractibility, or combination of plastic material and the like with other additives.

Actions/Effects

In accordance with the present embodiment as explained above, it is possible to disperse the pressing force during operating the cross key 22, the push button 21 and the like into the grip cushions 3a and 3b to reduce concentration of the pressing force on the fingertips. Also, since the controller can be stably held, the operability is improved to enhance game skill improvement.

Furthermore, in the case of the present embodiment, there are the cover 30 made of silicone covering the entirety of the game controller 2, the sound reduction covers 33a and 33b covering the cross key 22, the push buttons 21 and the right and left buttons 25a and 25b which are operation parts, and the sound reduction rings 34a and 34b arranged surrounding the protruding portions of the joy sticks 24a and 24b, so that it is possible to muffle or reduce clatter noise of "kacha kacha" during operation of the cross key 22 and the joy sticks 24a and 24b and prevent unpleasant operation noise from being heard by surrounding persons and a chat partner. Still further, the cover 30 acts as a buffer during mutual abutting of parts to prevent breakage.

Furthermore, since the game controller 2 is grasped and fixed by the holder unit 4, the operator can take easy posture without applying any excessive force only by putting both hands on the grips 2a and 2b. Still further, while control becomes unstable and operation is deranged due to repeated striking and strain when holding the game controller 2 only with hands, in accordance with the present embodiment, it is possible to stabilize control and hold the game controller 2 even in a special way which is often employed by advanced-level players. Still further, it is possible to lessen the burden on the hands by arranging the pair of the grip cushions 5a and 5b in the position of the hands and continue play for a long time.

In addition to this, it is possible to view information of a game screen displayed on a television screen, as an expanded view, even in the posture in which elbows rest on the cushions 5a with both hands being placed on the fixed game controller 2, by placing the magnifying glass 7 on the pad 5 adjusting the height position and orientation of the lens member 73 through the flexible pipe 72. For example, it is possible to view a miniature map (position indication of an opponent) displayed in a screen during playing a game with a broader range of view which is 1.5 to 3 times broader than usual so that the map can easily be viewed to shorten the viewpoint moving range, and the player dominates the opponent to proceed with the game. Furthermore, the FIG. 82 can be fixed to the pad 5 through the display stand 8 so that the game can be more enjoyed by decoration with a character relating to the game which is being played.

As has been discussed above, in accordance with the present embodiment, it is possible to collect, on the pad 5, the devices, items and goods which are required to enjoy the game, easily build a compact gaming room, and further improve the entertainment value of the game.

Note that, this invention is not limited to the above-mentioned embodiments. Although it is to those skilled in the art, the following are disclosed as the one embodiment of this invention.

Mutually substitutable members, configurations, etc. disclosed in the embodiment can be used with their combination altered appropriately.

Although not disclosed in the embodiment, members, configurations, etc. that belong to the known technology and can be substituted with the members, the configurations, etc. disclosed in the embodiment can be appropriately substituted or are used by altering their combination.

Although not disclosed in the embodiment, members, configurations, etc. that those skilled in the art can consider as substitutions of the members, the configurations, etc. disclosed in the embodiment are substituted with the above mentioned appropriately or are used by altering its combination.

While the invention has been particularly shown and described with respect to preferred embodiments thereof, it should be understood by those skilled in the art that the foregoing and other changes in form and detail may be made therein without departing from the sprit and scope of the invention as defined in the appended claims.

EXPLANATION OF SYMBOLS

1 . . . operation assistance set
2 . . . game controller
2a, 2b . . . grip
2c . . . front end
2d . . . lower end
3a, 3b . . . grip cushion
4 . . . holder unit
5 . . . pad
5a, 5b . . . cushion
7 . . . magnifying glass
8 . . . display stand
21 . . . push button
22 . . . cross key
24a, 24b . . . joystick
25a, 25b . . . right and left button
30 . . . cover
30a, 30b . . . protrusion portion
33a, 33b . . . sound reduction cover
34a, 34b . . . sound reduction ring
38 . . . communication interface
39 . . . output interface
39a . . . speaker
39b . . . LED
41 . . . pedestal member
42 . . . ball joint member
43 . . . grasping unit
50 . . . stand
51a . . . USB terminal
51b . . . audio terminal
51c USB input terminal
52 . . . LED
56 . . . control unit
57 . . . memory
58 . . . communication interface
59 . . . output interface
59a . . . speaker
59b . . . LED
59c . . . oscillator
71 . . . pedestal
72 . . . flexible pipe
73 . . . lens member
81 . . . display stand
82 . . . FIG.
90a, 90b . . . external speaker
91 . . . control unit
91a . . . application execution unit
91b . . . synchronization processing unit
91c . . . output data generation unit
91d . . . apparatus control unit
92 . . . input interface
92a . . . camera
93 . . . output interface
93a . . . display unit
94 . . . communication interface
97 . . . memory
321 . . . curved surface
322 . . . tangent
421 . . . shaft member
431 . . . lower end member
432 . . . telescopic unit
433 . . . upper end member

What is claimed is:

1. An operation assistance apparatus for assisting operation of a game controller which is disposed away from a game machine executing a game program and through which an operation signal is input to the game apparatus, the operation assistance apparatus comprising:
a holder unit configured to hold and fix the game controller and capable of adjusting an inclination angle of the game controller which is fixed;
a plate base to which the holder unit is fixed to extend upward;
an item which detachably fixes an accessory to an arbitrary position of an upper surface of the base;
a signal receiving unit which is incorporated in the base to receive signals output from the game apparatus; and
a control unit which controls an output device incorporated in or connected to the base in synchronization with the signals received by the signal receiving unit.

2. The operation assistance apparatus of claim 1 further comprising:
a grip cushion arranged adjacent to operation parts of the game controller and mounted on a grip for holding the game controller, wherein
the grip cushion is provided with a protrusion portion which is protruding upward on the upper surface side of the grip on which the operation parts are arranged, and includes a curved surface continuously formed from a vertex of the protrusion portion to the operation parts in order that an extension line of a tangent in contact with all or part of the surface of the curved surface goes across the operation parts.

3. The operation assistance apparatus of claim 1 further comprising:
a magnifying glass which is detachably fixed to the item detachably fixing the accessory and magnifies a screen outputted and displayed from the game machine.

4. The operation assistance apparatus of claim 1 further comprising:
a flexible sound reduction member which covers at least the operation parts of the game controller.

5. The operation assistance apparatus of claim 1 wherein
the game controller is provided with a joy stick which is protruding upward from an upper surface of the game controller, and further comprising
a sound reduction member arranged surrounding the protruding portion of the joy stick and made of a resilient material.

6. The operation assistance apparatus of claim 1 further comprising:
a cushion member connected to the base through the item detachably fixing the accessory, and made of a material having a shock-absorbing property.

7. The operation assistance apparatus of claim 1 further comprising:
a display unit which is detachably provided on the base through the item detachably fixing the accessory, and through which an article is detachably connected to the base.

8. An operation assistance method for assisting operation of a game controller which is disposed away from a game machine executing a game program and through which an operation signal is input to the game apparatus, wherein
- a holder unit configured to hold and fix the game controller is fixed to a plate base to extend upward, and adjust an inclination angle of the game controller which is fixed, and an accessory is fixed to an arbitrary position of an upper surface of the base, and
- a control unit controls an output device incorporated in or connected to the base in synchronization with signals which are output from the game apparatus and received by a signal receiving unit incorporated in the base.

9. The operation assistance method of claim 8 wherein
a grip cushion mounted on a grip for holding the game controller to be arranged adjacent to operation parts of the game controller, wherein
the grip cushion is formed with a protrusion portion which is protruding upward on the upper surface side of the grip on which the operation parts are arranged, and wherein
the grip cushion includes a curved surface continuously formed from a vertex of the protrusion portion to the operation parts in order that an extension line of a tangent in contact with all or part of the surface of the curved surface goes across the operation parts.

10. The operation assistance method of claim 8 wherein
an item detachably fixing the accessory detachably fixes a magnifying glass which faces and magnifies a screen outputted and displayed from the game machine.

11. The operation assistance method of claim 8 further comprising:
a flexible sound reduction member which covers at least the operation parts of the game controller, and a sound reduction member which is made of a resilient member and arranged surrounding the protruding portion of the joy stick protruding upward from an upper surface of the game controller.

12. The operation assistance method of claim 8 wherein
the item detachably fixing the accessory is used to detachably fix a cushion member which is connected to the base and made of a material having a shock-absorbing property.

13. The operation assistance method of claim 8 wherein
a display unit, through which an article is detachably connected to the base, is detachably provided on the base through the item detachably fixing the accessory.

* * * * *